(No Model.) 3 Sheets—Sheet 1.
H. G. SCHNARR.
EXTENSION TABLE.
No. 529,140. Patented Nov. 13, 1894.
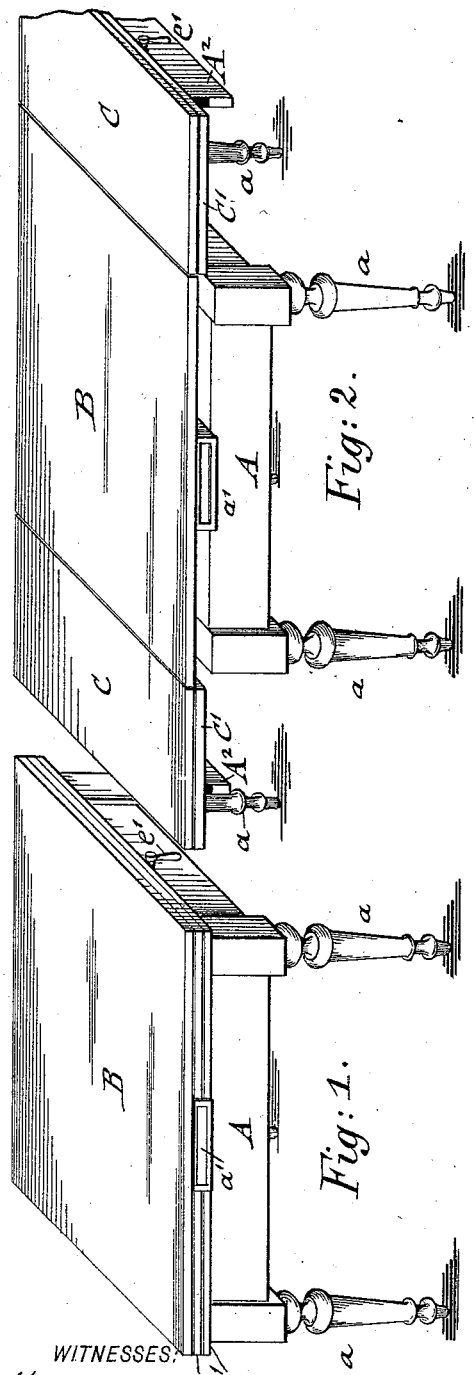
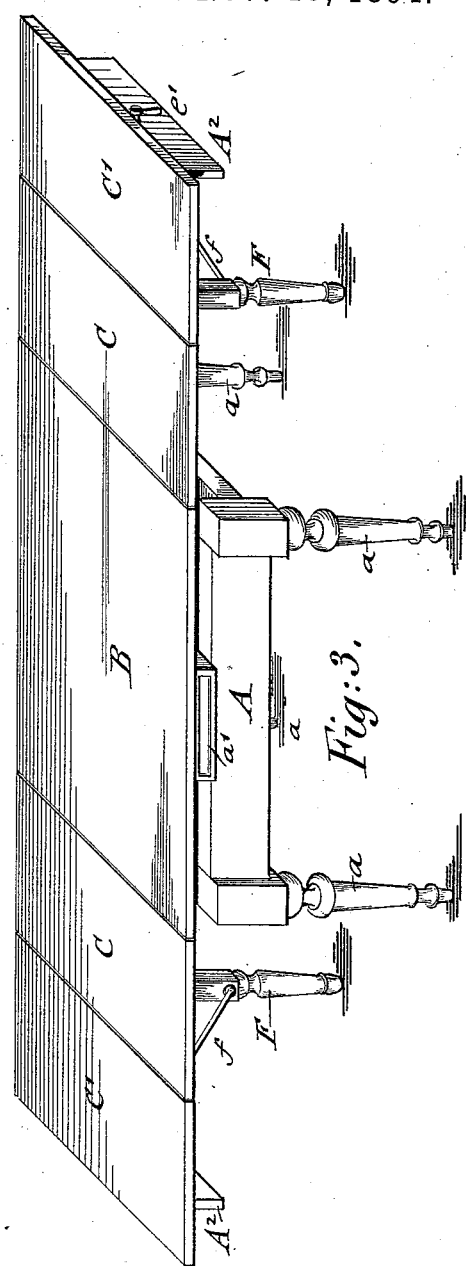

(No Model.) 3 Sheets—Sheet 2.
H. G. SCHNARR.
EXTENSION TABLE.
No. 529,140. Patented Nov. 13, 1894.
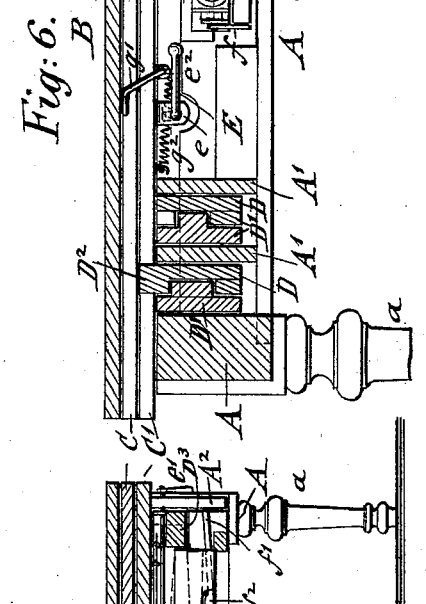
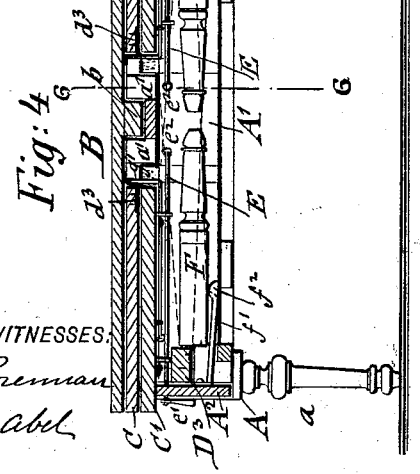
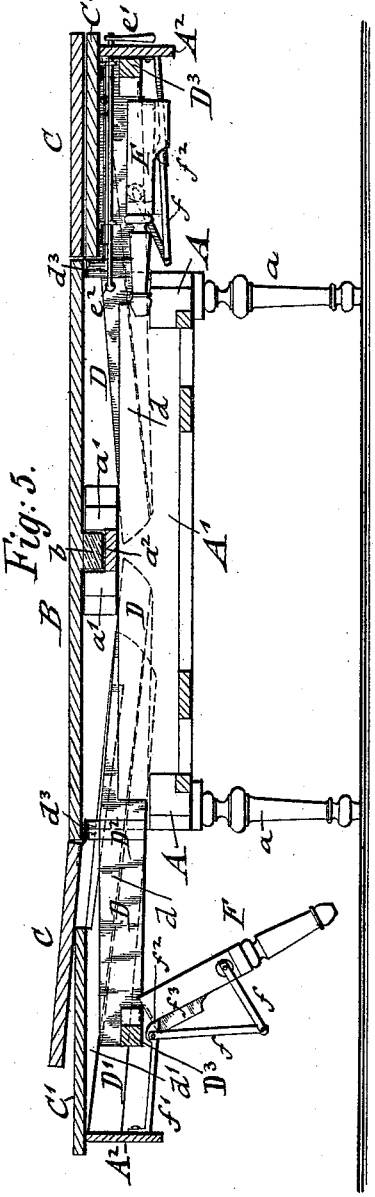
WITNESSES:
K. R. Brennan
Juan C. Abel
INVENTOR
Henry G. Schnarr
BY
ATTORNEYS.

(No Model.) 3 Sheets—Sheet 3.
H. G. SCHNARR.
EXTENSION TABLE.

No. 529,140. Patented Nov. 13, 1894.

WITNESSES:

INVENTOR
Henry G. Schnarr
BY
ATTORNEYS.

UNITED STATES PATENT OFFICE.

HENRY G. SCHNARR, OF NEW YORK, N. Y.

EXTENSION-TABLE.

SPECIFICATION forming part of Letters Patent No. 529,140, dated November 13, 1894.

Application filed June 13, 1894. Serial No. 514,385. (No model.)

*To all whom it may concern:*

Be it known that I, HENRY G. SCHNARR, a citizen of the United States, residing in the city, county, and State of New York, have invented certain new and useful Improvements in Extension-Tables, of which the following is a specification.

This invention has reference to an improved extension-table, in which the leaves are not removed and stored away in a separate box, but in which the leaves are stored away below the top of the main part of the table and drawn out when required for use.

The invention consists of an extension-table, which comprises a central main-frame having a loose top-part that is retained by a transverse piece in a correspondingly-recessed portion of the main-frame, so as to be movable in vertical direction, one or more leaves at each end of the top and adapted to be drawn in outward direction until they arrive at a level with the top, slides that are attached to the under side of the leaves and guided in ways alongside of each other, and a lifting device attached to the outer leaf and adapted for lifting the intermediate leaf and the top-part of the main-frame when the leaves are to be pushed inwardly and returned below the top of the main-frame.

The invention consists, further, of an auxiliary leg that is hinged to a transverse piece connecting the slides of the intermediate leaf and connected by a pivoted folding-strap with a stationary bracket-arm attached to a fixed transverse piece of the outermost leaf, so that the leg is moved into a vertical position when the leaf is drawn out, and into a horizontal position when the leaf is pushed back so as to be stored away below the top of the main portion.

The invention consists further of certain details of construction, which will be fully described hereinafter and finally pointed out in the claims.

Figure 7:
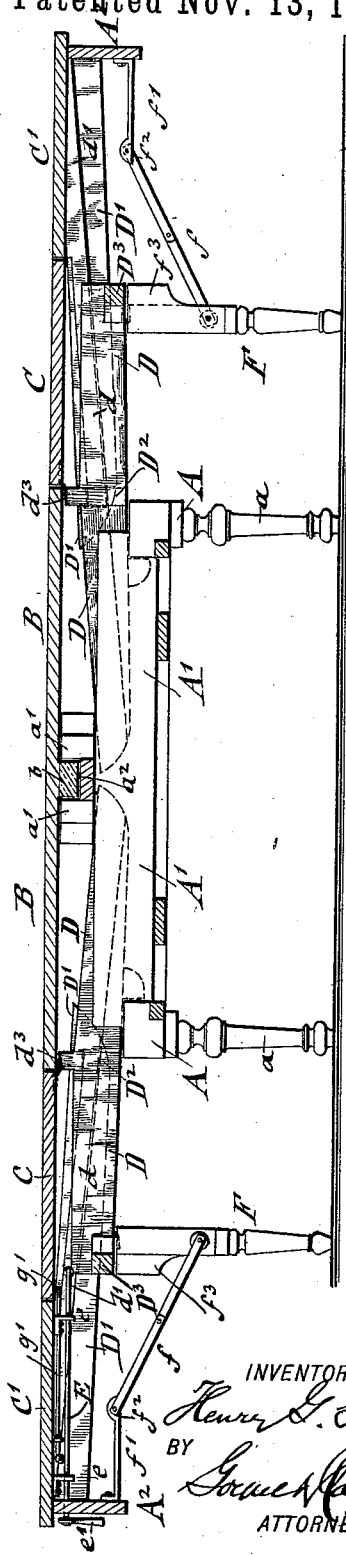
Figure 8:
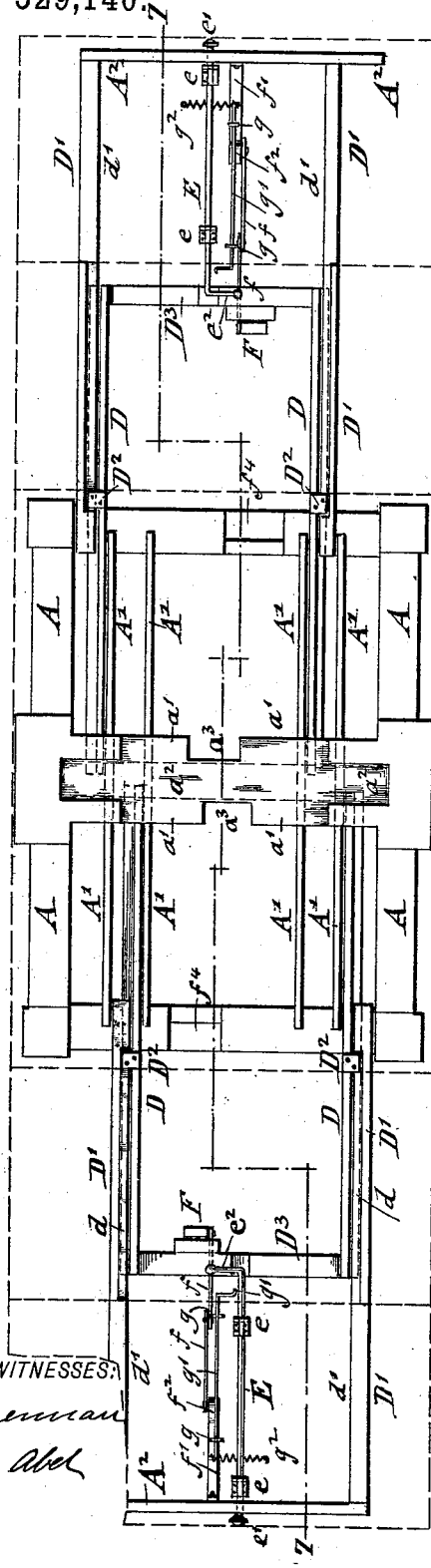

In the accompanying drawings, Figure 1 represents a perspective view of my improved extension-table, showing the extension-leaves stored away below the top of the main-frame of the table. Figs. 2 and 3 are likewise perspective views of the extension-table, showing respectively one and two leaves drawn out at each end. Fig. 4 is a vertical longitudinal section of the extension-table, showing the leaves stored away below the main portion. Fig. 5 is also a vertical longitudinal section, showing one leaf drawn out at each end of the table and a second leaf drawn out partly at one end, so as to show the auxiliary supporting-leg, in the act of being lowered. Fig. 6 is a vertical transverse section on line 6—6, Fig. 4, drawn on a larger scale. Fig. 7 is a vertical longitudinal section of the table, on line 7—7, Fig. 8, showing all the leaves drawn out and the auxiliary legs in position for supporting the outermost leaves, and Fig. 8 is a top view of Fig. 7 with the leaves of the table shown in dotted lines.

Similar letters of reference indicate corresponding parts.

My improved extension-table belongs to that class in which one or two leaves are stored away below each end of the top of the main-frame, and in such a manner, that one leaf at each end or two leaves at each end may be drawn out according to the length to which the table is to be extended, said leaves being quickly returned and stored away below the top of the main-frame when a table of smaller size is required. For this purpose, it is necessary to make the top of the main-frame not stationary on said frame, but movable in vertical direction, so that it yields sufficiently to permit the drawing out of the leaves and the returning of the same into their normal or folded position.

Referring to the drawings, A represents the main-frame of my improved extension-table, which frame is supported on legs $a$, one at each corner of the same. The main-frame A is provided with fixed transverse pieces $a'$, in which a recess $a^2$ is formed, as shown clearly in Figs. 4, 5 and 7, into which fits a transverse cleat $b$, that is attached to the under side of the top B. The top B is thereby supported loosely on the main-frame A, so that it can be lifted off and detached entirely for inspecting the slides and guideways of the extension-leaves arranged below the same. Below each end of the top B are arranged two extension-leaves C C', which are adapted to be drawn out until they arrive finally on a level with the top B. The lowermost leaf C' is provided with inclined slides D' that are guided by cleats $d'$, $d'$, in ways $d$, $d$, of the slides D of the intermediate leaf C, the leaves C' C' being drawn out together, when only one extension-leaf is required at each end of the table, as shown in Fig. 2 and at the right hand side of Fig. 5. In this case, the inner ends of the inclined slides D' of the lower leaf C' are located sidewise of the inclined slides D of the intermediate leaf C. The slides D are not attached directly to the leaf C, but to uprights $D^2$, to which the inner end of the intermediate leaf C is connected at two points by means of thin flexible steel-plates or bands $d^3$ that are attached by screws to the top of the upright pieces $D^2$ and to the under side of the intermediate leaf C. This yielding connection of the intermediate leaf C with the upright pieces $D^2$ is necessary for imparting the proper motion to the intermediate leaf during the outward and inward motion of the same. The inner ends of the inclined slides D' bear on the transverse pieces $a'$ of the main-frame A, when the intermediate leaves are drawn out, as shown in Figs. 5 and 7, and rest on the transverse end-pieces of the main-frame A. The inclined slide-pieces D and D' of the intermediate and outer leaves C and C' are guided between stationary longitudinal pieces A' of the main-frame A and between said pieces A' and the side-pieces of the main-frame A, as shown in Figs. 6, 7 and 8. The upper edges of the outermost portions of the inclined slides D' are made horizontal, so that thereby the outer leaf C' is supported across its entire width, as shown at the left hand side of Fig. 5. To the outer part of each extension-leaf C' and at right angles to the slides D' is attached a transverse piece $A^2$, which serves to close the main-frame A at the ends when the extension-leaves are stored away below the top B, as shown in Fig. 4.

To the under side of each outermost leaf C' are applied eyes $g$ in which is supported a rod $g'$, the inner end of which is bent in upward and then in lateral direction, while a spiral spring $g^2$ is attached to the outer end of the rod, which serves to press the upwardly-bent end on the under side of the adjacent leaf, so as to permit the cushioning of the top and of the intermediate leaf, when the leaves are drawn out. At the under side of the outermost leaf C' is further supported by means of suitable ears $e$, a crank-rod E, which passes through the transverse end-piece A and is provided outside of the same with a crank-handle $e'$ and at the inner end with a crank-arm $e^2$ having a rounded off end, for producing the lifting of the intermediate extension-leaf C and of the top B when the extension-leaves are returned into position below the top of the main portion. The crank-rod E also serves to take hold of the intermediate and outer leaves and pull them in outward direction when the table is to be extended, the inner crank-arm $e^2$ being stored away in a recess $a^3$ of the transverse piece $a'$ of the main-frame A, when the extension-leaves are returned below the top B. The crank-rod E is used when the extension-leaves are drawn out and when they are returned into position below the top B. When drawing out the extension-leaves, the inner end of the crank-rod E is first moved in downward direction so as to engage the transverse piece $D^2$ at the outer end of the slides D of the intermediate leaf and move it simultaneously with the outer leaf C' in outward direction until it clears the top B and assumes the position flush with the same. During the outward motion of the leaves, the top B is slightly lifted, it being dropped when they are drawn out clear of the top, which latter is then cushioned by the spring-actuated rod $g'$. The outer leaf C' is drawn then out farther by taking hold of the crank-handle $e'$ or of the transverse piece $A^2$ until it arrives in line with the intermediate leaf C and top B. The intermediate leaf C drops on the slides D' of the outermost leaf C', it being cushioned by the spring-actuated end of the rod $g'$, so that no sudden blow or concussion is produced on the slides by the heavy extension-leaf. When both the intermediate and the outer leaves are placed in extended position, the intermediate leaf is supported at its inner end on the upright pieces $D^2$ and at its outer end on the slides D' of the outer leaf C', as shown clearly in Fig. 7, so that a very steady and reliable support for the extension-leaf is obtained.

When it is desired to make a smaller extension-table, the intermediate leaf C at each end of the top B is entirely dispensed with, in which case only the outer leaf C' and its slides D' are employed. As this, however, permits only the arrangement of two leaves, one at each end of the top of the main-frame, this table would only be useful for small families, as a kitchen-table and for other purposes. For large families an extension-table is required that permits an extension to about three times the length of the top of the main-frame and for such a table the intermediate and outer extension-leaves are necessary.

In the smaller extension-table, with one leaf at each end, the extension-leaf is returned below the top B by lifting the latter with the inner end of the crank-rod sufficiently so as to permit the pushing in of the extension-leaf until it abuts at its inner end against the transverse piece $a'$ of the main-frame A and is then covered entirely by the top B as shown in Fig. 1. In larger extension-tables with two leaves at each end, the leaves are returned below the top B, by placing the inner end of the crank-rod E first under the intermediate leaf C, so that it lifts the same above the outer leaf C', which lifting action is permitted by the flexible connection of the opposite end of the intermediate leaf C with its upright pieces $D^2$. The outer leaf C' is then pushed inwardly below the intermediate leaf C until it assumes the position shown at the right hand end of Fig. 5. The crank-rod E is then again operated, so as to lift the adjacent end of the top B sufficiently to permit the simultaneous pushing in of the intermediate and outer leaves until both abut against the transverse piece $a'$ and are covered by the top B, as shown in Fig. 4. Owing to the inclined inner ends of the slide-pieces D D', both leaves C C' can be stored away below the top B of the main portion, one below the other, the inclination of the slides permitting the lowering the leaves sufficiently during the inward motion of the slides, so that they gradually assume their relative positions first below each other and then below the top, as shown in Fig. 4.

When two extension-leaves C C' are arranged at each end of the main-frame A, it is preferable to provide an auxiliary leg F for the outer leaf, so as to give a better support to the same and render thereby the entire structure more stable and reliable. The leg F is hinged to the transverse connecting-piece $D^3$ of the slides D of the intermediate leaf C, as shown in Figs. 7 and 8, and connected by a folding pivot-strap $f$ with a bracket-arm $f'$ that is rigidly secured at one end to the transverse piece $A^2$ of the outer leaf C', and that is provided at its inner end to which the connecting-strap $f$ is pivoted, with a rounded off or wedge-shaped portion $f^2$, which latter serves to move along the upper end of the leg F and along a projection $f^3$ attached to said upper end, as shown in Fig. 5, so that during the inward motion of the outer leaf C' the pivoted connecting-strap $f$ is folded alongside of the auxiliary leg F until the wedge-shaped end $f^2$ engages the leg F and moves along the projection $f^3$ so as to produce thereby the gradual swinging up of the auxiliary leg F until it arrives in a horizontal position between the slides D' and is then pushed inwardly with the latter and stored away within the main frame A, as shown in Fig. 4. During the outward motion of the outer leaf C', the downwardly swinging of the auxiliary leg F takes place as soon as the same clears the main-frame A, owing to the gradual withdrawing of the wedge-shaped end of the bracket-arm $f$ from the leg F. When the leaf C' arrives at its outermost position, the connecting-strap $f$ assumes an inclined position between the bracket-arm $f'$ and the leg F, so as to act in the nature of a brace between the same, as shown in Figs. 3 and 7. The downward and upward swinging of the auxiliary leg F takes place automatically during the outward or inward motion of the outer extension-leaves C C', so that no special manipulation is required for placing the auxiliary legs in position.

For permitting the inward sliding of the auxiliary leg F when it has arrived in a horizontal position, as shown in Fig. 5, the transverse end-pieces of the main-frame A are recessed, as at $f^4$, Fig. $8^4$ so that the auxiliary leg can move inwardly into the main-frame until it arrives below the transverse piece $a'$, as shown in Fig. 4.

When it is desired to change the table from its ordinary size into a table with one or more extension-leaves, the crank-handle of the outermost leaf is taken hold of and turned sidewise, so that the inner crank-arm engages the transverse piece $D^2$ of the intermediate leaf C and permits thereby the pulling out of the intermediate and outer leaves C C' until they arrive in the position shown in Fig. 5. The crank-rod is then turned down, so that the inner end releases the transverse piece $D^2$. The outward motion of the outer leaf C' is continued until it is flush with the intermediate leaf C, as shown in Fig. 7. During the outward motion of the leaf C', the auxiliary leg F is simultaneously swung in downward direction until it assumes a vertical position and supports the slide-pieces D of the intermediate leaf C, and by the same the slide-pieces D' of the outer leaf C' in a very steady manner.

When it is desired to return the leaves into position below the top of the main portion, the crank-rod is used for the purpose of lifting the intermediate leaf C, so as to permit the inward motion of the outer leaf C' until it arrives below the intermediate leaf C. A second upward motion of the crank-rod lifts then the end of the top B of the main-portion, and permits the inward motion of both leaves C C' until they arrive below the top B. Simultaneously with the inward pushing of the outer leaf C', the auxiliary leg is swung up into horizontal position, and moved then inwardly with the leaves into the main-frame, so as to be stored away with the leaves below the top of the same.

The advantages of my improved extension-table are that the leaves are always at hand, ready for immediate use whereby the extension-table is especially adapted for families living in flats and tenement-houses, in which usually after meals, the leaves are returned and the table restored to its normal size, so as to give more room. The extension-table is comparatively inexpensive, especially the simpler kind in which one extension-leaf at each end is used. When two extension-leaves are used at each end, the table is somewhat more expensive, as it requires the arrangement of an auxiliary leg at each end.

Having thus described my invention, I claim as new and desire to secure by Letters Patent—

1. In a table, the combination of a main frame, a top supported loosely thereon, an intermediate extension leaf having inclined slide pieces, flexible straps for connecting the inner end of said leaf with the slide pieces, an outer leaf also provided with inclined slide pieces guided in the slide pieces of the intermediate leaf, and a crank rod supported in ears at the under side of the outer leaf and provided with a crank arm at its inner end, said crank rod being adapted for use both in extending or returning the leaves, substantially as described.

2. In a table, the combination of a main frame, a top supported loosely thereon, an intermediate and an outer leaf arranged under the end of the top, slide pieces attached to said intermediate leaf and provided with a connecting transverse bar, slide pieces attached to the outer leaf, an auxiliary leg provided with a projection near its upper end said leg being hinged to said transverse bar, a bracket arm connected to said outer leaf and provided with a wedge-shaped inner end for sliding along said projection on the leg, and a pivoted strap connecting said bracket and leg.

3. The combination with a main-frame, of a top supported loosely on the same, an intermediate leaf, and an outer leaf arranged under each end of the top, inclined slide-pieces attached to the intermediate and outer leaves, means for guiding the said slide-pieces alongside of each other and in the main-frame, an auxiliary leg hinged to the transverse connecting-piece of the slides of the intermediate leaf, a bracket-arm attached to a transverse end-piece of the outer leaf, said bracket-arm having a wedge-shaped inner end, a pivoted connecting-strap between the bracket-arm and the auxiliary leg, and a projection at the upper end of the auxiliary leg, substantially as set forth.

In testimony that I claim the foregoing as my invention I have signed my name in presence of two subscribing witnesses.

HENRY G. SCHNARR.

Witnesses:
PAUL GOEPEL,
K. R. BRENNAN.